Figures 1, 2:
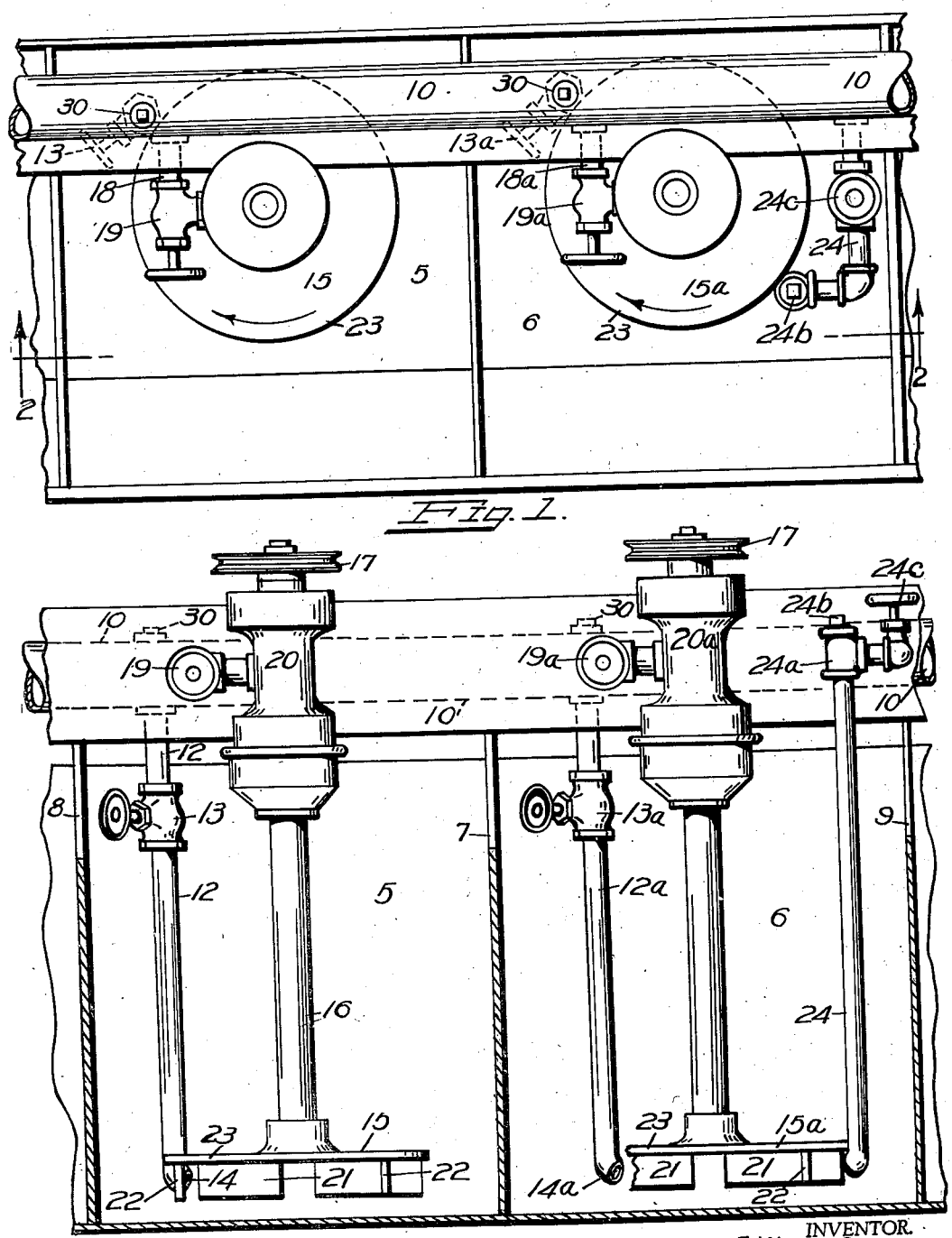

May 27, 1941.  A. J. WEINIG  2,243,301

AERATION APPARATUS

Filed Dec. 15, 1938

INVENTOR.
ARTHUR J. WEINIG
BY Rollandet, McGrew & Campbell
ATTORNEYS.

Patented May 27, 1941

2,243,301

UNITED STATES PATENT OFFICE 2,243,301

AERATION APPARATUS

Arthur J. Weinig, Golden, Colo., assignor to Morse Bros. Machinery Company, Denver, Colo., a corporation of Colorado Application December 15, 1938, Serial No. 245,866

4 Claims. (Cl. 261—93)

This invention relates to improvements in apparatus for agitation and aeration of fluent matter. There are numerous industries in which the intimate and thorough mixing of a gas with fluent matter is of high importance. By fluent matter is meant any liquid, semi-liquid or mixture of liquid with solids either in solution or in suspension or any other combination of matter that has the general properties of a fluid.

As a typical example of a practical application of the present apparatus, its benefit to the art of mineral flotation may be considered. Briefly, mineral flotation is commonly practiced by preparing a pulp containing the minerals to be separated, subjecting the pulp to agitation and aeration, and floating one or more of the constituents of the pulp which may be either the wanted or unwanted factors. Such pulp is typically prepared by grinding ore containing one or more valuable constituents and mixing it either during or after the grinding with a liquid, commonly water, and adding one or more flotation reagents having a selective affinity for the component to be floated. The reagent may be added to the pulp in a conditioner process prior to the actual flotation or the reagent may be added to the pulp at the time it is introduced into a flotation cell.

The actual flotation is best effected by extreme agitation of the pulp and thorough simultaneous aeration. By aeration is meant the introduction of a gas commonly air, but which might also be carbon dioxide, oxygen or any other gas depending upon the nature of the material and process involved. This gas with the assistance of the flotation reagent or reagents, forms innumerable minute bubbles to which the particles of material to be floated adhere and by which they are floated to the surface of the pulp to form a froth, which is then skimmed off to effect the final separation of materials. Ordinarily and within reasonable limits, the more gas that is mixed or dissolved in the fluent matter or pulp and the more intimately such gas is mixed with said fluent matter or pulp, the more efficient and complete will be the desired separation.

Usually it is preferable to have a zone of intense agitation with aeration in a body of pulp or the like, above which is a quiescent zone through which the bubbles rise to form the froth at the surface. It is desirable to have the bubbles rise through the quiescent zone without agitation or too much colliding with each other because disturbances of this kind in the quiescent zone might cause the floated matter to fall back in the liquid body. Various means and methods of agitation and aeration have been used and the present invention resides in a sharp improvement in agitation and aeration heretofore unknown.

The present apparatus is also well adapted to a conditioning process as hereinabove referred to, particularly the conditioning of a pulp prior to a cyanide treatment. Furthermore, in certain industrial operations, it is sometimes desirable to supply heat, or conversely, to remove heat units from a body of fluent matter together with aeration and agitation. Under these conditions, heat units might be supplied to a fluent body through the intermediary of the present apparatus and method, using steam or super-heated steam as the "gas," or pre-heated air or any other gas. Or for the removal of heat units from a fluid body, gas at a temperature below that of said body may be introduced by the present apparatus and method. Or heat units can be absorbed by allowing gas to expand from high pressure to low pressure within the body of the pulp.

Therefore, the principal object of the present invention is to provide apparatus whereby a body of fluent matter as above defined, may be subjected to simultaneous agitation and aeration more thoroughly and advantageously than was heretofore known.

Another object of the invention is the provision of aeration apparatus that readily can be cleaned and kept free from the choking effects of accumulated matter, particularly when used in a mineral flotation operation or the like.

A further object is to provide improvements of this kind that can easily be installed and used on flotation apparatus, or other aeration and/or agitation machines, that are already in use.

Other objects and advantages reside in details of design and construction which will be more fully disclosed in the following description and in the drawing wherein like parts have been similarly designated and in which:

Figure 1 is a fragmentary plan view of apparatus built according to this invention and which is well adapted to perform the improved method; and Figure 2 is a vertical, fragmentary sectional view taken approximately along the line 2—2 of Figure 1.

In this instant illustration, reference character 5 denotes a container for fluent matter which may be merely a mixing or conditioning tank, or it might be considered as one cell of a flotation machine. Reference character 6 represents a similar container and if these containers be considered as adjacent cells in a flotation apparatus, an overflow connection therebetween may be represented at 7, an inlet to 5 at 8, and an overflow exit from 6 at 9. It is to be definitely understood, however, that this invention is not limited to any kind of a flotation apparatus or method and the instant illustration is not even so limited.

Reference character 10 denotes a header adapted to contain and conduct a flow of gas as above broadly defined. The header 10 has a branch conductive conduit 12 that is under manual control by a suitable valve 13. The lower end of conduit 12 has a discharge opening 14 which is preferably inclined between horizontal and vertical and which faces toward a rotary impeller 15 carried on a hollow shaft 16, which may be rotated through the intermediary of a pulley 17, which may be driven by a suitable V-belt drive from any convenient prime mover not shown.

The header 10 is provided with another branch conduit 18 which is under manual control by means of a suitable angle valve 19 and which is connected with a sealed chamber 20 that is in conductive communication with the hollow interior of the shaft 16. This conductive communication with the hollow shaft 16 is preferably effected by structure made according to my copending application Serial No. 199,883.

The construction of the impeller 15 is of importance and is preferably according to U. S. Patent No. 1,998,694, issued April 23, 1935, to Arthur J. Weinig. Some of the particular and important features of this type of impeller are that it is provided with certain radially ranging vanes indicated in the present drawing by reference character 21, and other vanes 22 that are arranged as chords across a circular disk 23 that supports said vanes. As more fully set out in the above-mentioned patent, the radially ranging vanes 21 impart centrifugal force to the fluent matter in which the impeller is rotated, thus tending to throw such matter that is so acted upon, outwardly of the impeller.

The chord-like vanes 22 have a definite slicing action and they cut across the paths of the fluent matter being outwardly thrown by the centrifugal force of vanes 21, to thereby introduce a factor of extreme agitation in the fluent matter adjacent the impeller and, further, to draw back into the zone of agitation, certain portions of the fluent matter that are being thrown outwardly by centrifugal action. This type of impeller has been extensively used and has proven of high advantage over common impellers.

It will be seen that the discharge opening 14 of the gas conductive conduit 12 is adjacent the periphery of the impeller 15, and is preferably below the disk 23 thereof. As gas is discharged from header 10 through conduit 12 and out of discharge opening 14, it will immediately be drawn into the zone of intense activity by means of the slicing chord-like vanes 22 and the currents in the fluid matter created thereby in cooperation with the action of the radially ranging vanes 21 and their resultant fluid currents. This fact produces a degree of aeration or mixing of the gas with the fluent matter that is superior to anything heretofore known or accomplished, and permits the use of heavy viscous reagents which thus readily emulsify and which in general cannot be used with other types of flotation machines.

Gas may also be introduced into the fluid body in the zone of intense agitation through the intermediary of the branch conduit 18, valve 19, chamber 20, and hollow shaft 16, said shaft 16 being open as is common practice, at its lower extremity, which is substantially at the center of rotation of the impeller 15 and therefore substantially in the center of the zone of agitation. However, the aeration effected by the discharge of gas at 14 is highly effective and usually sufficient and it is not generally necessary to introduce gas also through the hollow shaft 16. In fact, an important consideration in the present inventive concept, is that the gas conduits, as exemplified in the drawing as parts 12, 12a and 24, can be installed very easily in apparatus already in use, and even those that lack a hollow impeller shaft.

Another form of the present invention is illustrated wherein reference character 12a represents a branch conduit similar to the conduit 12 hereinabove described, and valve 13a and discharge opening 14a correspond to elements 13 and 14 respectively. Likewise, branch conduit 18a and angle valve 19a correspond to 18 and 19 hereinabove set forth. Reference character 20a represents a hollow sealed chamber around a hollow shaft 16a, through which gas from header 10 may be discharged at the center of a rotary impeller 15a that is made according to the impeller 15 above described in sufficient detail.

Another valve controlled conduit 24 is in conductive connection with the header 10 and is provided with an inclined discharge opening adjacent its lower end, similar to discharge openings 14 and 14a. The discharge openings of conduits 12a and 24 are preferably at opposite sides of the impeller 15a and located adjacent the periphery thereof.

It will be seen that simultaneous discharge of gas into the fluent body, from conduits 12a and 24, during rotation of the impeller 15a, will be similar to the results hereinabove described but will be highly intensified because of the dual discharge of gas at opposite sides of the periphery of the impeller 15a and the zone of intense agitation created in the fluid body thereby.

The general effect of agitation and aeration according to this disclosure is that streams of fluent matter with or without gas, are thrown outwardly of the impeller by centrifugal action and their paths are sliced across by the chord-like vanes 22 which tend to draw back into the zone of agitation, other currents and portions of the fluent body, together with gas being discharged adjacent the periphery of the impeller and the agitation zone. Obviously, fluent matter and gas thus drawn into the agitation zone will tend to be again thrown out and, therefore, in the embodiment of the invention shown in receptacle 6 of the drawing, gas drawn into the zone of activity from conduit 24, may travel around with the impeller 15a and then to be thrown out adjacent the discharge port 14a of conduit 12a. Simultaneously, gas being taken into the zone of activity from conduit 12a, may tend to be discharged adjacent conduit 24 or elsewhere around the perimeter of the impeller and the agitation zone.

Obviously, any number of branch discharge conduits similar to conduits 12, 12a and 24 may be used, the present illustrations being merely illustrative examples of reductions to practice.

A particular feature in the present apparatus is the extremely short bend at the lower end of the respective conduits 12, 12a and 24 and the inwardly and downwardly inclined discharge openings illustrated at 14 and 14a. These openings are effective for discharging gas in a direction having both an inward and downward component of motion to insure said gas being drawn into the zone of agitation by the particular action of the impellers as above set forth. Furthermore, this arrangement of the discharge openings provides for ready cleaning of the downwardly ranging conduits, particularly when they are made according to the arrangement exemplified in conduit 24. In this example, a T-fitting 24a has an upwardly facing plug 24b, which may be removed preferably but not necessarily when the gas pressure is turned off by valve 24c, whereupon a ramrod cleaner may be inserted down through the lower portion of conduit 24, and particularly if the rod is somewhat flexible, it may be projected clear out of the inclined discharge opening to insure thorough cleaning and free passage of gas.

The valves 13 and 13a have been conventionally illustrated but they are preferably of the gate or plug type to permit insertion of the cleaning rod therethrough. Where branch gas lines or conduits, such as 12 and 12a, are directly below the header, plugs 30 or the like, are to be located in the header, in alinement with the branches, so that the cleaning rod may be inserted therethrough, and down through the said conduits.

It will thus be seen that the herein disclosed apparatus for aeration and agitation of a fluent body under any circumstances whatsoever where such aeration and agitation are desirable, are effective for highly and advantageous results and the stated objectives of the invention are fully accomplished.

While this specification discloses preferred means for reducing the present invention to practice and a preferred embodiment of the invention, changes may occur to those skilled in the art and may be made within the scope of the appended claims, without departing from the spirit of the invention.

What I claim and desire to secure by Letters Patent is:

1. In flotation apparatus, inclusive of a tank and in the lower portion thereof, a rotary impeller having vanes positioned to produce a combined pumping, slicing and striking action causing countercurrent movement of pulp across the periphery of the impeller, the improvement which comprises a gas-delivery conduit having its discharge outlet at the periphery of the impeller.

2. In flotation apparatus, inclusive of a tank and in the lower portion thereof, a rotary impeller having vanes positioned to produce a combined pumping, slicing and striking action causing countercurrent movement of pulp across the periphery of the impeller, the improvement which comprises a gas-delivery conduit having its discharge outlet externally of the periphery of the impeller in proximity thereto.

3. In flotation apparatus, inclusive of a tank and in the lower portion thereof, a rotary impeller having vanes positioned to produce a combined pumping, slicing and striking action causing countercurrent movement of pulp across the periphery of the impeller, the improvement which comprises a valve-controlled gas-delivery conduit having its discharge outlet at the periphery of the impeller.

4. In flotation apparatus, inclusive of a tank and in ahe lower portion thereof, a rotary impeller having vanes positioned to produce a combined pumping, slicing and striking action causing countercurrent movement of pulp across the periphery of the impeller, the improvement which comprises two gas-delivery conduits having their respective discharge outlets disposed on opposite sides of the impeller at the periphery thereof.

ARTHUR J. WEINIG.